Patented Aug. 11, 1936　　　　　　　　　　　　　　　　　　　　　　　　　　2,050,661

UNITED STATES PATENT OFFICE 2,050,661

N-SUBSTITUTION PRODUCTS OF 1,4-DIAMINOANTHRAQUINONES

Karl Koeberle, Christian Steigerwald, and Robert Schweizer, Ludwigshafen-on-the-Rhine, Germany, assignors to General Aniline Works, Inc., New York, N. Y., a corporation of Delaware No Drawing. Application October 22, 1935, Serial No. 46,207. In Germany September 19, 1933

8 Claims. (Cl. 260—60)

The present invention relates to N-substitution products of 1,4-diaminoanthraquinones and a process of producing same. This application is a continuation in part of our application Ser. No. 743,480.

We have found that N-substitution products of 1,4-diaminoanthraquinone, in which one hydrogen atom in each of the 1- and 4-amino groups is replaced by the same alkyl, aralkyl, cycloalkyl, aryl or heterocyclic radicle, are obtained by reacting anthraquinone derivatives of the general formula

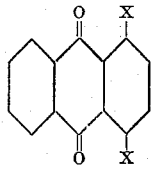

wherein the X's stand for equal or different groups of the class consisting of the hydroxyl, alkoxy and amino groups with at least two molecular proportions of a primary amine in the presence of a leuco compound of an anthraquinone having the general formula

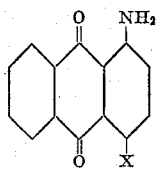

wherein X stands for a hydroxyl, alkoxy or amino group.

As anthraquinone derivatives having the first formula shown above may be mentioned by way of example the following: 1.4-diaminoanthraquinone, 1.4-dihydroxyanthraquinone, 1-amino-4-hydroxyanthraquinone, 1-amino-4-methoxyanthraquinone, 1-amino-4-ethoxyanthraquinone and 1,4-dimethoxyanthraquinone. Suitable leuco compounds of the kind defined above are, for example, leuco 1,4-diaminoanthraquinone, leuco-1-amino-4-hydroxyanthraquinone, and leuco-1-amino-4-methoxyanthraquinone. The amount of the leuco compound employed may be varied within wide limits. It is, however, preferable to use about 10 to 30 per cent thereof calculated on the quantity of the anthraquinone compounds employed as initial substances.

The amines suitable for the process according to the present invention may be chosen from any class of primary amines, the amines containing the amino group attached to a carbon atom in aliphatic combination being especially suitable. Amino compounds containing besides the free amino group substituents or ring members having a strong acidifying influence upon the molecule of the said compounds are less suitable for this reaction. Due to this fact, especially amino compounds containing cyclic bound keto groups such as aminoanthraquinone or aminobenzanthrone are practically unsuitable as primary amines for the purpose of this invention.

The reaction is carried out with advantage in the presence of a diluent such as water, aliphatic alcohols of low molecular weight, ethers, esters, ketones, hydrocarbons or halogenated hydrocarbons. In some cases it is preferable to work at superatmospheric pressure. The reaction even takes place at slightly elevated temperatures, temperatures from 60° to 150° C. being especially suitable. Generally speaking the reaction temperature depends on the nature of the initial materials.

The reaction products according to this invention are generally obtained in very good yields and in a high state of purity. If desired, they may be purified by sublimation or recrystallization from the usual organic solvents. In order to remove any parts of leuco compound present in the resulting product the reaction mixture may be aftertreated with an oxidizing agent. It is preferable to lead oxygen or air through the reaction mixture before separating the reaction product. A small amount of a copper compound and of a secondary or tertiary base is advantageously added during the oxidation.

In nearly all cases the compounds thus obtainable are especially suitable for dyeing cellulose esters and ethers or for coloring fats, oils, waxes, lacquers, liquid or solid hydrocarbons and artificial compositions of various kinds or in sulphonated state for dyeing wool.

The following examples will further illustrate how the said invention may be carried out in practice, but the invention is not restricted to these examples. The parts are by weight.

Example 1

A mixture of 76 parts of 1,4-dihydroxyanthraquinone, 20 parts of leuco 1,4-diaminoanthraquinone, 120 parts of a 25 per cent aqueous solution of methylamine and 700 parts of isobutyl alcohol is heated, while stirring, at from 60° to 70° C. until initial material can no longer be detected which is the case after about 10 to 12 hours. The reaction mixture is allowed to cool, and the resulting product is filtered off by suction, washed with methanol and dried. The 1,4-dimonomethyldiaminoanthraquinone thus obtained dyes acetate artificial silk blue shades.

By employing, instead of methylamine, other alkylamines, as for example ethylamine, normal-propylamine, normal-butylamine, amylamines, hexylamines, gamma-dimethylaminopropylamine, mono - phenylethylenediamine, mono-hydroxyethylethylenediamine, the correspondingly substituted 1,4-diaminoanthraquinones are obtained which not only are capable of dyeing acetate artificial silk but also are suitable for coloring hydrocarbons, oils, fats, waxes, paraffin waxes and artificial compositions.

Example 2

A mixture of 79 parts of 1,4-dihydroxyanthraquinone, 21 parts of leuco-1,4-diaminoanthraquinone, 60 parts of ethanolamine and 1000 parts of water is heated to boiling for 12 hours while stirring. The reaction mixture is allowed to cool, and the resulting compound is filtered off by suction, washed with water and dried. The 1,4 - dihydroxyethyldiaminoanthraquinone thus obtained in the form of blue crystals dyes acetate artifical silk blue shades.

Similar dyestuffs are obtained by replacing the ethanolamine by beta-hydroxypropylamine, gamma-hydroxypropylamine or beta-hydroxy-normal-butylamine.

Example 3

A mixture of 79 parts of 1,4-dihydroxyanthraquinone, 21 parts of leuco-1,4-diaminoanthraquinone, 100 parts of benzylamine and 1000 parts of isobutyl alcohol is heated at from 95° to 100° C. for about 10 hours while stirring. The reaction mixture is allowed to cool and the precipitate is filtered off by suction, washed with methanol and dried. The 1,4-dimonobenzyldiaminoanthraquinone thus obtained is a blue crystalline powder. By carefully treating it with concentrated sulphuric acid or oleum, a sulphonic acid is obtained which dyes wool blue shades.

1,4-diaminoanthraquinones substituted in a corresponding manner are obtained by employing, instead of benzylamine, for example beta-phenylethylamine, omega-amino-1-methylnaphthalene, cyclohexylamine or 1,2,3,4-tetrahydro-2-amino-naphthalene.

Example 4

A mixture of 48 parts of 1,4-dihydroxyanthraquinone, 49 parts of leuco-1,4-diaminoanthraquinone, 70 parts of normal-butylamine and 700 parts of butanol is heated at from 60° to 70° C. for about 12 hours while stirring. After the addition of 1 part of copper acetate and 6 parts of piperidine, air is led through the reaction mixture until it has become completely blue. It is then allowed to cool and the blue crystals separated are filtered off by suction, washed with methanol and dried. The 1.4-di-normal-butyl-diaminoanthraquinone thus obtained is especially suitable for coloring hydrocarbons.

In this case, the normal-butylamine may also be replaced by other amines containing aliphatically combined amino groups.

Example 5

A mixture of 79 parts of 1,4-diaminoanthraquinone, 21 parts of leuco-1,4-diaminoanthraquinone, 100 parts of normal-butylamine and 800 parts of isobutyl alcohol is heated at 140° C. in a closed vessel for 10 hours while stirring. After cooling, the reaction product is filtered off by suction, washed with methanol and dried. The 1,4-di-normal-butyl-diaminoanthraquinone thus obtained in the form of blue crystals may readily be purified by recrystallizing it for example from monochlorbenzene. It is eminently suitable for coloring oils, hydrocarbons, waxes and artificial masses.

1,4-diaminoanthraquinones substituted in a corresponding manner are obtained by employing, instead of normal-butylamine other amines, as for example methylamine, normal-propylamine, ethylamine, ethanolamine, gamma-dimethylaminopropylamine, mono-hydroxy-ethylethylenediamine, benzylamine or cyclohexylamine.

Example 6

A mixture of 80 parts of 1,4-diaminoanthraquinone, 20 parts of leuco-1,4-diaminoanthraquinone, 100 parts of benzylamine and 800 parts of butyl alcohol is boiled while stirring until starting material is no longer detectable. The reaction mixture is then allowed to cool, the blue crystals separated are filtered off by suction, washed with methanol and dried. By recrystallization from nitrobenzene the 1,4-dibenzyldiaminoanthraquinone is obtained in pure state.

In a similar manner the correspondingly substituted 1,4-diaminoquinones are obtained by employing instead of benzylamine cyclohexylamine or beta-phenylethylamine.

Example 7

A mixture of 80 parts of 1,4-diaminoanthraquinone, 20 parts of leuco-1-amino-4-hydroxyanthraquinone, 150 parts of cyclohexylamine and 600 parts of cyclohexanol is heated while stirring at 160° C. for 15 hours. After cooling the 1,4-dicyclohexyldiaminoanthraquinone separated is filtered off by suction, washed with methanol and dried. It is a blue crystalline powder, which is suitable for coloring artificial masses or paraffin waxes blue shades of color being obtained.

Example 8

A mixture of 80 parts of 1-amino-4-methoxyanthraquinone, 20 parts of leuco-1,4-diaminoanthraquinone, 200 parts of a 25 per cent aqueous solution of methylamine and 700 parts of isobutyl alcohol is heated while stirring in a closed vessel at 140° C. for 15 hours. After cooling the 1,4-dimonomethyldiaminoanthraquinone formed is filtered off by suction, washed with methanol and dried. It is a blue powder which dyes acetate artificial silk blue shades.

By employing other primary alkylamines instead of methylamine the correspondingly substituted 1,4-diaminoanthraquinones are obtained. The 1-amino-4-methoxyanthraquinone can be replaced, for example, by 1-amino-4-hydroxyanthraquinone.

Example 9

A mixture of 80 parts of 1,4-dihydroxyanthraquinone, 20 parts of leuco-1,4-diaminoanthraquinone, 100 parts of cyclohexylamine and 800 parts of isobutyl alcohol is heated while stirring at about 100° C. for about 18 hours. After cooling the blue needles separated are filtered off by suction, washed with methanol and dried. The 1,4-dicyclohexylaminoanthraquinone thus obtained is suitable for coloring artificial masses blue shades of color being produced.

Example 10

A mixture of 79 parts of 1,4-dihydroxyanthraquinone, 21 parts of leuco-1,4-diaminoanthraquinone, 100 parts of para-toluidine and 700 parts of cyclohexanol is heated at about 160° C. for about 15 hours while stirring. The reaction mixture is then allowed to cool, the 1,4-di-para-toluido-anthraquinone formed is filtered off by suction, washed with methanol and dried. It is a blue powder.

By employing, instead of para-toluidine, other arylamines, for example aniline, anisidines, aminophenols, naphthylamines, phenylenediamines, aminoquinolines, aminocarbazoles, aminodiphenyleneoxides, the correspondingly substituted 1,4-diaminoanthraquinones are obtained. By treating with sulphonating agents the said 1,4-diarylaminoanthraquinones yield dyestuffs, which dye wool from blue to green shades from an acid bath.

Example 11

A mixture of 40 parts of 1,4-dihydroxyanthraquinone, 20 parts of leuco-1,4-diaminoanthraquinone, 40 parts of boric acid, 80 parts of 4-aminodiphenyl and 540 parts of cyclohexanol is heated at 150° C. for about 15 hours. After the addition of one part of copper acetate, air is led through the boiling mixture until it has become completely blue. After cooling the 1,4-diphenyldiaminoanthraquinone thus formed is filtered off by suction, washed with methanol and dried. It is a blue powder.

Example 12

A mixture of 152 parts of 1,4-dihydroxyanthraquinone, 40 parts of leuco-1-amino-4-hydroxyanthraquinone, 140 parts of 1,2-propanolamine and 1400 parts of isobutyl alcohol is heated while stirring at about 100° C. for 20 hours. After cooling, the 1,4 - dimono-beta-hydroxypropyldiaminoanthraquinone is filtered off by suction, washed with methanol and dried. It is a blue crystalline powder which dyes acetate artificial silk blue shades.

Example 13

A mixture of 80 parts of 1,4-dihydroxyanthraquinone, 20 parts of leuco-1,4-diaminoanthraquinone, 70 parts of 1,3-propanolamine and 700 parts of isobutyl alcohol is heated while stirring at 100° C. for 20 hours. After cooling the 1,4-di-gamma-hydroxypropyldiaminoanthraquinone is filtered off by suction, washed with methanol and dried. It is a blue powder which dyes acetate artificial silk blue shades.

By employing butanolamines instead of 1,3-propanolamine the corresponding 1,4-dihydroxybutylaminoanthraquinones are obtained which dye also acetate artificial silk blue shades.

What we claim is:—

1. A process of producing 1,4-diaminoanthraquinones corresponding to the general formula

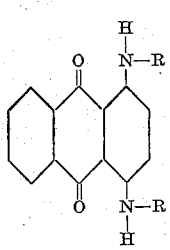

wherein R stands for an organic radicle which comprises reacting a compound of the general formula

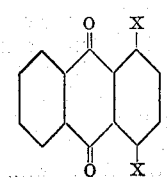

wherein the X's stand for equal or different groups of the class consisting of the hydroxyl, alkoxy and amino groups, with at least two molecular proportions of a primary amine in the presence of a leuco compound of an anthraquinone having the general formula

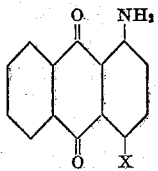

wherein X represents a member of the group consisting of the hydroxyl, alkoxy and amino groups.

2. A process of producing 1,4-diaminoanthraquinones corresponding to the general formula

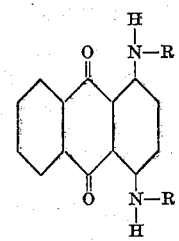

wherein R stands for an organic radicle the carbon atom directly attached to the N-atom shown being aliphatically combined therewith which comprises reacting a compound of the general formula

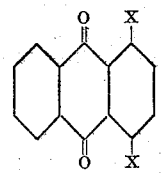

wherein the X's stand for equal or different groups of the class consisting of the hydroxyl, alkoxy and amino groups, with at least two molecular proportions of a primary amine the amino group of which is attached to an aliphatically combined carbon atom, in the presence of a leuco compound of an anthraquinone having the general formula

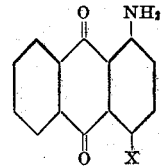

wherein X represents a member of the group consisting of the hydroxyl, alkoxy and amino groups.

3. A process of producing 1,4-diaminoanthraquinones corresponding to the general formula

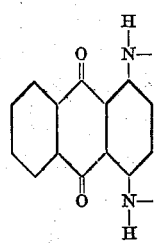

wherein R stands for alkyl which comprises reacting a compound of the general formula

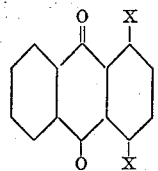

wherein the X's stand for equal or different groups of the class consisting of the hydroxyl, alkoxy and amino groups, with at least two molecular proportions of a primary amine of the aliphatic series in the presence of a leuco compound of an anthraquinone having the general formula

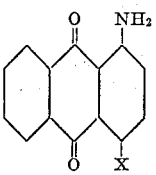

wherein X represents a member of the group consisting of the hydroxyl, alkoxy and amino groups.

4. A process of producing 1,4-diaminoanthraquinones corresponding to the general formula

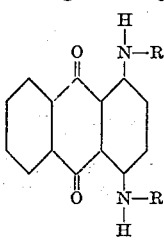

wherein R stands for an organic radicle which comprises reacting a compound of the general formula

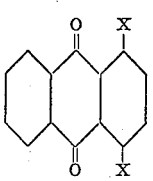

wherein the X's stand for equal or different groups of the class consisting of the hydroxyl, alkoxy and amino groups, with at least two molecular proportions of a primary amine in the presence of a leuco compound of an anthraquinone having the general formula

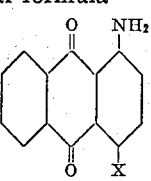

wherein X represents a member of the group consisting of the hydroxyl, alkoxy and amino groups in the presence of a diluent.

5. A process of producing 1,4-diaminoanthraquinones corresponding to the general formula

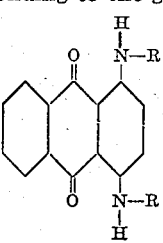

wherein R stands for an organic radicle which comprises reacting a compound of the general formula.

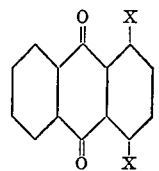

wherein the X's stand for equal or different groups of the class consisting of the hydroxyl, alkoxy and amino groups, with at least two molecular proportions of a primary amine in the presence of a leuco compound of an anthraquinone having the general formula

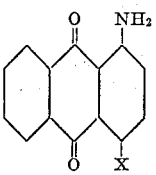

wherein X represents a member of the group consisting of the hydroxyl, alkoxy and amino groups, the amount of the latter being at least 10 per cent calculated on the amount of the anthraquinone compounds employed as starting materials in the presence of a diluent.

6. A process of producing 1,4-diaminoanthraquinones corresponding to the general formula

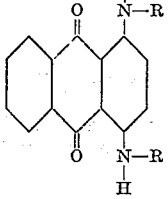

wherein R stands for an organic radicle which comprises reacting a compound of the general formula

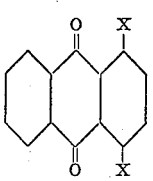

wherein the X's stand for equal or different groups of the class consisting of the hydroxyl, alkoxy and amino groups, with at least two molecular proportions of a primary amine in the presence of a leuco compound of an anthraquinone having the general formula

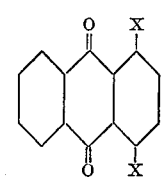

wherein X represents a member of the group consisting of the hydroxyl, alkoxy and amino groups, the amount of the latter being at least 10 per cent calculated on the amount of the anthraquinone compounds employed as starting materials, in the presence of a diluent at a temperature between about 60° and about 140° C.

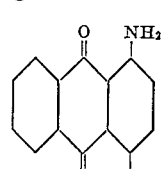

7. A process of producing 1,4-diaminoanthraquinones corresponding to the general formula

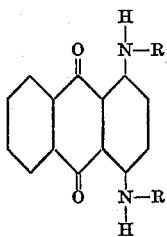

wherein R stands for an organic radicle which comprises reacting a compound of the general formula

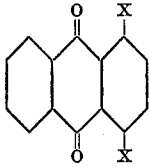

wherein the X's stand for equal or different groups of the class consisting of the hydroxyl, alkoxy and amino groups, with at least two molecular proportions of a primary amine in the presence of leuco-1.4-diaminoanthraquinone and in the presence of a diluent at a temperature between about 60° and about 120° C.

8. The 1,4-diaminoanthraquinone having the formula

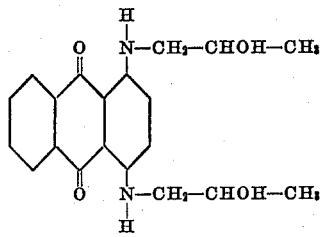

KARL KOEBERLE.
CHRISTIAN STEIGERWALD.
ROBERT SCHWEIZER.